United States Patent [19]

Ungrue

[11] Patent Number: 5,708,955
[45] Date of Patent: Jan. 13, 1998

[54] METHOD OF MANUFACTURING A COMPONENT FOR AN ELECTROMAGNETIC FRICTION CLUTCH ASSEMBLY

[75] Inventor: James R. Ungrue, Sewell, N.J.

[73] Assignee: Dana Corporation, Toledo, Ohio

[21] Appl. No.: 558,906

[22] Filed: Nov. 16, 1995

[51] Int. Cl.⁶ .................................................. B22F 1/00
[52] U.S. Cl. ............................... 419/6; 419/8; 419/66
[58] Field of Search ................................. 419/6, 8, 66

[56] References Cited

U.S. PATENT DOCUMENTS

| | | |
|---|---|---|
| 3,324,982 | 6/1967 | Mason et al. . |
| 3,894,892 | 7/1975 | Conta . |
| 4,413,717 | 11/1983 | Kanamaru et al. . |
| 5,183,632 | 2/1993 | Kiuchi et al. . |
| 5,335,760 | 8/1994 | Leone . |

FOREIGN PATENT DOCUMENTS

| | | |
|---|---|---|
| 674055 | 6/1952 | United Kingdom . |
| 1406348 | 10/1973 | United Kingdom . |
| 2288609 | 10/1995 | United Kingdom . |
| 2292390 | 2/1996 | United Kingdom . |

*Primary Examiner*—Charles T. Jordan
*Assistant Examiner*—Anthony R. Chi
*Attorney, Agent, or Firm*—MacMillan, Sobanski & Todd

[57] ABSTRACT

A method for manufacturing a component for use in an electromagnetically actuated clutch, such as an armature or a pole piece, having one or more flux breaks provided therein includes the initial step of providing a mold having an upstanding central post which defines an annular mold cavity. A quantity of powdered metal material is disposed within the mold cavity. The powdered metal material is formed from a magnetically permeable material, such as a ferromagnetic material. Next, one or more preforms of a non-magnetically permeable material are disposed within the mold cavity. The preform is placed on top of the quantity of powdered metal material axially above the desired location for the magnetically non-conductive region of the component to be formed. Then, a ram of a press machine is moved axially downwardly into engagement with the preform and the powdered metal material contained within the mold. As the ram moves downwardly, it initially engages the preform, moving it axially downwardly through the powdered metal material until the preform engages the lower surface of the mold. Further downward movement of the ram compresses both the preform and the powdered metal material into a single integrated component preform. Lastly, the ram is retracted to permit removal of the component preform, and the component preform is placed in a conventional sintering oven to form the final component.

20 Claims, 3 Drawing Sheets

METHOD OF MANUFACTURING A COMPONENT FOR AN ELECTROMAGNETIC FRICTION CLUTCH ASSEMBLY

BACKGROUND OF THE INVENTION

This invention relates in general to electromagnetically actuated friction clutch assemblies and in particular to an improved method for manufacturing a component for use in such an electromagnetically actuated friction clutch assembly.

Clutches are well known devices which are commonly used in machinery to selectively connect a source of rotational power to a rotatably driven mechanism. A basic clutch structure includes an input shaft connected to the source of rotational power, an output shaft connected to the rotatably driven mechanism, and means for selectively connecting the input shaft to the output shaft for concurrent rotation. When the means for selectively connecting is engaged, the input shaft is connected to the output shaft so as to rotatably drive the mechanism. When the means for selectively connecting is disengaged, the input shaft is disconnected from the output shaft, and the mechanism is not rotatably driven. Many different types of clutches are known in the art for accomplishing this general purpose.

In friction type clutches, the input shaft is connected to an input member which is rotatably driven by the source of rotational power. The input member is usually fixed in a predetermined axial position. Such a friction clutch further includes an armature which is constrained to rotate with the input member, but is free to move axially relative thereto between engaged and disengaged positions. In the engaged position, the armature frictionally engages an output member which is connected to the output shaft. When this occurs, the output shaft is driven to rotate with the input shaft. In the disengaged position, however, the armature is spaced apart from the output member and, therefore, provides no rotational driving connection therewith. Often, the armature is normally maintained in the disengaged position so as not to frictionally engage the output member unless affirmatively moved into the engaged position. Friction clutches of this general type are well known in the art.

In some friction clutches, an electromagnet is used to cause movement of the armature between the engaged and disengaged positions. Electromagnetically actuated friction clutches operate on the principle that a magnetic field which is created about a component formed from a magnetically permeable material will exert a mechanical force on that component. This mechanical force will urge the component to move to a position of minimum resistance relative to the flow of magnetic flux (lines of force) generated by the magnetic field, usually referred to as a position of minimum reluctance. Thus, in electromagnetically actuated friction clutches, the armature and the output member are usually both formed from a magnetically permeable material. When the electromagnet is energized, the electromagnetic field generated thereby attracts the armature toward the output member. As a result, the armature is moved from the disengaged position to the engaged position to connect the input shaft to the output shaft and, thus, cause the driven device to be rotatably driven by the source of rotational power.

The output member of the electromagnetically actuated friction clutch is typically embodied as an annular pole piece having a generally U-shaped cross section. The pole piece is formed having a flat pole face which is normally axially separated from the armature by a relative small air gap. Because they are both formed from a magnetically permeable material, the armature will be attracted to move axially toward the output member when the electromagnet is energized. To increase the magnitude of this magnetic attraction, and thereby increase the torque transmitting capability of the clutch as a whole, the armature and the pole face of the pole piece are frequently divided into one or more pole regions by a non-magnetically permeable material. These separate pole regions cause the magnetic flux generated by the electromagnet to jump back and forth several times across the air gap separating the armature and the pole face when the electromagnet is energized. For reasons which are well known in the art, this magnetic flux discontinuity structure, or more simply flux break, is effective to increase the magnitude of the magnetic attraction between the armature and the pole piece.

In the past, the flux breaks have been provided in the armature and the pole face by forming slots or recesses in the armature and the pole face. These slots or recesses define relatively large air gaps between adjacent pole regions of the magnetically permeable material. Although effective to increase the magnetic attraction between the armature and the pole piece, the formation of such slots or recesses in pole face necessitates the removal of material from the pole piece, which has been found to weaken the overall strength thereof. Electromagnetically actuated friction clutches of this type are often used to selectively transmit relatively high torque loads. Consequently, any weaknesses in the pole piece diminish the torque transmitting capacity of the clutch as a whole. Furthermore, because electromagnetically actuated clutches of this type are often used in automotive applications, such as in air conditioner compressor assemblies, they must be relatively simple and inexpensive in construction. Accordingly, it would be desirable to provide an improved method for manufacturing a component for use in an electromagnetically actuated clutch having one or more flux breaks, such as an armature or a pole piece, which addresses these concerns.

SUMMARY OF THE INVENTION

This invention relates to an improved method for manufacturing a component for use in an electromagnetically actuated clutch, such as an armature or a pole piece, having one or more flux breaks provided therein. Initially, a mold is provided having an upstanding central post which defines an annular mold cavity. A quantity of powdered metal material is disposed within the mold cavity. The powdered metal material is formed from a magnetically permeable material, such as a ferromagnetic material. Next, one or more preforms of a non-magnetically permeable material are disposed within the mold cavity. The preform is placed on top of the quantity of powdered metal material axially above the desired location for the magnetically non-conductive region of the component to be formed. Then, a ram of a press machine is moved axially downwardly into engagement with the preform and the powdered metal material contained within the mold. As the ram moves downwardly, it initially engages Is the preform, moving it axially downwardly through the powdered metal material until the preform engages the lower surface of the mold. Further downward movement of the ram compresses both the preform and the powdered metal material into a single integrated component preform. Lastly, the ram is retracted to permit removal of the component preform, and the component preform is placed in a conventional sintering oven to form the final component.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
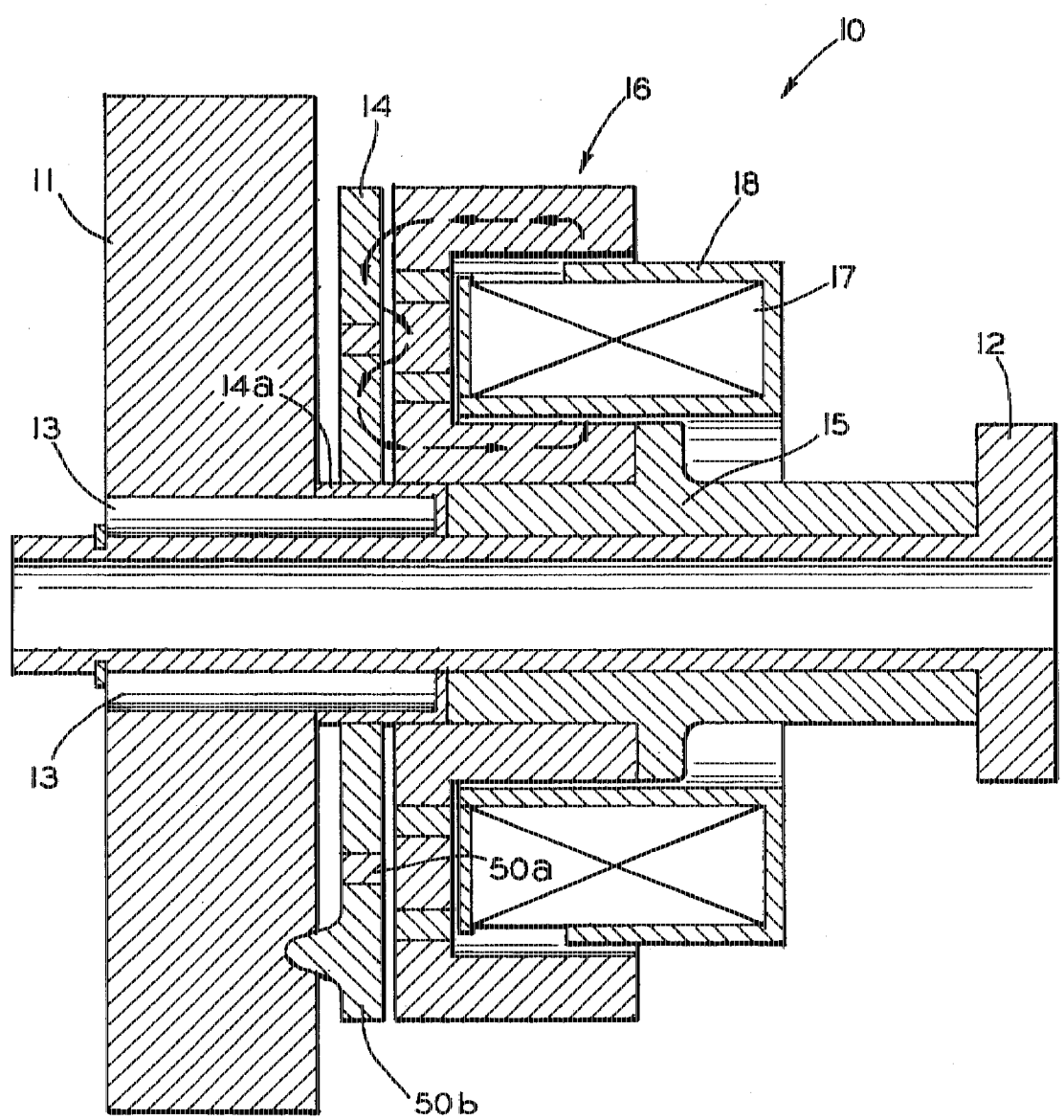
FIG. 1 is a sectional elevational view schematically illustrating an electromagnetically actuated friction clutch including an armature and a pole piece manufactured in accordance with this invention.

Referring now to the drawings, there is schematically illustrated in FIG. 1 an electromagnetically actuated friction clutch, indicated generally at 10, in accordance with this invention. The basic structure and operation of the clutch 10 are well known in the art. For example, U.S. Pat. No. 4,187,939 to Silvestrini et al., owned by the assignee of this invention, discloses a similar electromagnetically actuated friction clutch. The disclosure of that patent is incorporated herein by reference. Thus, only those portions of the electromagnetically actuated friction clutch 10 which are necessary for a complete understanding of this invention will be discussed.

The electromagnetically actuated friction clutch 10 is adapted to selectively connect a rotatably driven input member, such as an input gear 11, to a hollow cylindrical output shaft 12. The input gear 11 meshes with and is constantly rotatably driven by a source of rotational power (not shown) in any conventional manner. The input gear 11 is rotatably supported on the output shaft 12 by any conventional means, such as by a plurality of needle bearings 13. The electromagnetically actuated friction clutch 10 also includes an armature 14 which is connected to the input gear 11 for rotation therewith and for axial movement relative thereto in a known manner. The armature 14 is also rotatably supported on the output shaft 12 by means of a low friction bearing sleeve 14a. As will be explained in detail below, the armature 14 is primarily formed from a magnetically permeable material.

The electromagnetically actuated friction clutch 10 further includes a hollow cylindrical rotor 15 which is secured to the output shaft 12 for rotation therewith. A pole piece, indicated generally at 16, is mounted on the rotor 15 for rotation therewith. Thus, the pole piece 16, the rotor 15, and the output shaft 12 all rotate together as a unit. The pole piece 16 is annular and has a generally U-shaped cross section, defining an outer axially extending leg, a radially extending pole face, and an inner axially extending leg. A coil 17 of an electrical conductor is provided within the pole piece 16 so as to function as an electromagnet. The coil 17 is supported in a non-rotatable manner relative to the pole piece 16 by any conventional support structure (not shown). The coil 17 may be contained within a housing 18 within the pole piece 16. As will also be explained in detail below, the pole piece 16 is primarily formed from a magnetically permeable material.

As is well known, the coil 17 functions as an electromagnet when electrical current is passed therethrough. When so energized, the coil 17 generates an electromagnetic field. Magnetic flux flows along the path indicated by the arrows in FIG. 1 from the coil 17 axially in a first direction (toward the left in FIG. 1) through the radially outer leg of the pole piece 16 and across an air gap to the armature 14. Then, the magnetic flux flows radially inwardly through the adjacent faces of the armature 14 and the pole face of the pole piece 16, jumping back and forth therebetween several times as shown. Next, the magnetic flux flows axially in a second direction (toward the right in FIG. 1) s through the armature 14 and across an air gap to the radially inner leg of the pole piece 16 back to the coil 17. Normally, the armature 14 is maintained in the illustrated disengaged position, wherein it is axially spaced apart from the pole piece 16. A conventional spring (not shown) or other known means may be used to urge the armature toward the disengaged position. In this disengaged position, the armature 14 does not frictionally engage the pole face of the pole piece 16. As a result, the pole piece 16, the rotor 15, and the output shaft 12 are not rotatably driven by the input gear 11. When the coil 17 is energized as described above, the flow of magnetic flux causes the armature 14 to be attracted toward the pole piece 16. If a sufficient mount of electrical current is passed through the coil 17, the armature 14 will move axially to an engaged position, wherein it frictionally engages the pole face of the pole piece 16. In this engaged position, the armature 14 frictionally engages the pole piece 16 so as to cause the pole piece 16, the rotor 15, and the output shaft 12 to be rotatably driven by the input gear 11.

Figure 2:
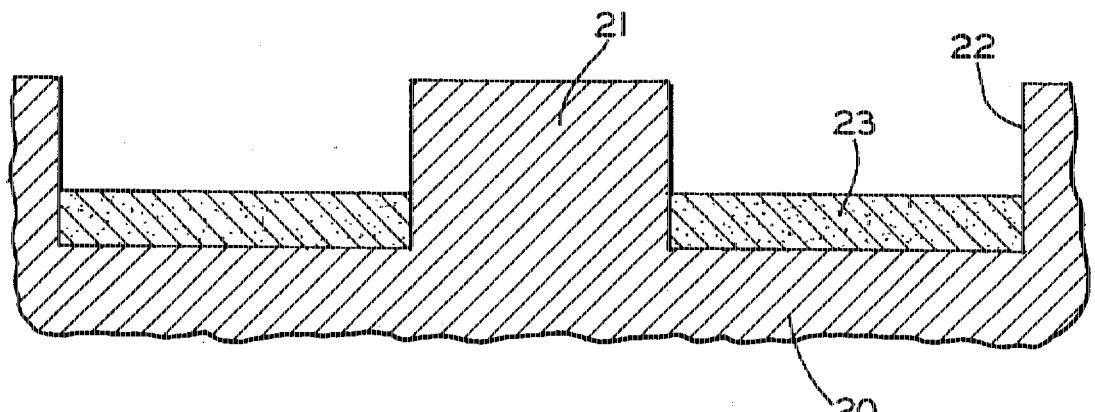
FIGS. 2, 3, and 4 are enlarged sectional elevational views illustrating the steps involved in a first embodiment of a method of forming the armature illustrated in FIG. 1 in accordance with this invention.
Figure 3:
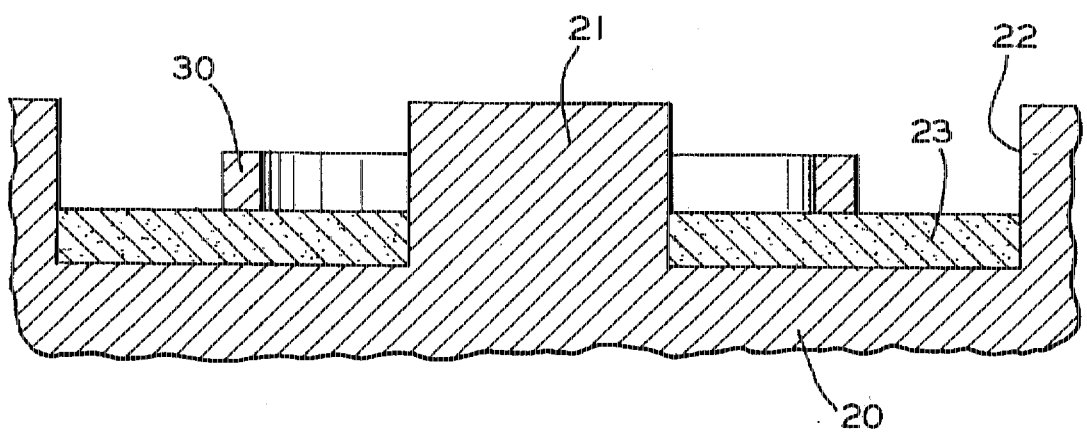
Figure 4:
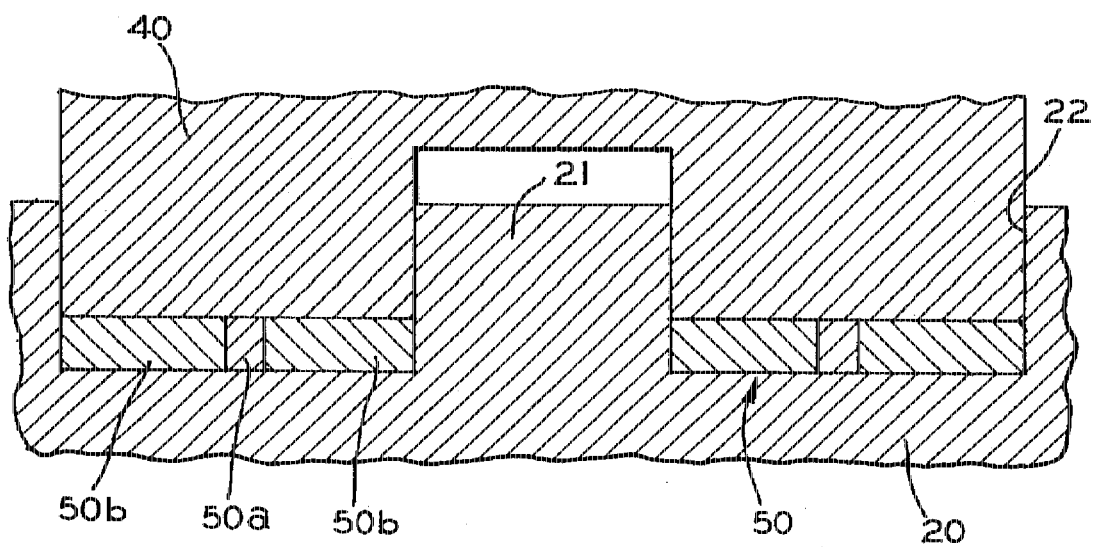

FIGS. 2, 3, and 4 illustrate a first embodiment of a method of forming the armature 14 discussed above in accordance with this invention. Referring first to FIG. 2, there is illustrated a conventional mold 20 having an upstanding central post 21 formed integrally therewith. The inner peripheral surface of the mold 20 and the outer peripheral surface of the post 21 define an annular cavity or recess 22 within the mold 20. As will become apparent below, the outer diameter of the mold cavity 22 (defined by the inner peripheral surface of the mold 20) is equal to the desired outer diameter of the armature 14 to be formed. Similarly, the inner diameter of the mold cavity 22 (defined by the outer peripheral surface of the post 21) is equal to the desired inner diameter of the armature 14 to be formed.

A quantity of powdered metal material 23 is disposed within the mold cavity 22. The powdered metal material 23 is formed from a magnetically permeable material, such as a ferromagnetic material. Ferromagnetic metals exhibit high magnetic permeability, have the ability to acquire high magnetization in relatively weak magnetic fields, and exhibit magnetic hysteresis, among other characteristics. Preferred ferromagnetic metals used to make the ferromagnetic member are selected from the group consisting of steel, iron, cobalt, nickel, and alloys thereof. Most preferred is iron, such as is commercially available from Hoeganaes Corporation of Riverton, N.J. under the designation 45P Anchorsteel phosphorous powder. The quantity of the powdered metal material 23 disposed within the mold cavity 22 is dependent upon the size of the armature 14 to be formed.

Referring now to FIG. 3, the next step in the method of forming the armature 14 is to provide a preform 30 of a non-magnetically permeable material. Preferably, the preform 30 is formed from an alloy of stainless steel powder which is pressed in a conventional manner into a desired shape. For example, the preform 30 can be formed from 316L stainless steel powder, which is also commercially available from Hoeganaes Corporation of Riverton, N.J. If desired, other materials, such as relatively small amounts of copper or a lubricant, may be mixed with the stainless steel powder prior to being pressed into the preform 30. The preform 30 can be formed using standard powdered metallurgy techniques, typically by compressing a quantity of the stainless steel powder in a mold at a pressure between about thirty-five tons per square inch and forty tons per square inch. The preform 30 is preferably formed having a density which is generally in the range of from 6.3 to 6.6 grams per cubic centimeter. However, the density of the preform 30 may be larger or smaller as desired. After being formed, the preform 30 is placed on top of the quantity of powdered metal material 23 disposed within the mold cavity 22, as shown in FIG. 3. As will become apparent below, the preform 30 is located relative to the powdered metal material 23 axially above the desired location for the magnetically non-conductive region of the armature 14 to be formed. As shown in FIG. 4, the next step in the method is to move a ram 40 of a conventional press machine axially downwardly into engagement with the preform 30 and the powdered metal material 23. As the ram 40 moves downwardly, it initially engages the preform 30, moving it axially downwardly through the powdered metal material 23 until the preform 30 engages the lower surface of the mold 20. Further downward movement of the ram 40 compresses s both the preform 30 and the powdered metal material 23 into a single integrated armature preform, indicated generally at 50. Typically, the axial thickness of the resulting armature preform 50 will be somewhat less than the original axial thickness of the preform 30.

Following completion of this step, the ram 40 is retracted to permit removal of the armature preform 50. The armature preform 50 is then placed in a conventional sintering oven to form the final armature 14. Preferably, the armature preform 50 is sintered in an atmosphere of full dissociated ammonia at an elevated temperature. For example, the armature preform 50 may be sintered at a temperature of about 2050° F. for a period of about ten minutes. This sintering process is performed to promote good bonding between those regions 50a of the armature preform 50 formed by the preform 30 and those regions 50b of the preform 50 formed by the powdered metal material 23.

As mentioned above, the armature 14 manufactured in accordance with this method is primarily formed from the compressed 45P Anchorsteel phosphorous material 23, which is magnetically permeable. As a result, the magnetic flux can flow along the path indicated by the arrows in FIG. 1 through the radially outermost and innermost regions 50b of the armature 14. However, these radially innermost and outermost regions 50b of the armature 14 which are formed from this magnetically permeable material are separated by the annular region 50a formed by the preform 30 of the 316L stainless steel powder, which is not a magnetically permeable material. Thus, in order to complete the magnetic circuit, the magnetic flux must jump from the radially outermost region 50b of the armature 14 across an air gap to the pole piece 16, then jump back to the radially innermost region 50b of the armature 14.

Figure 5:
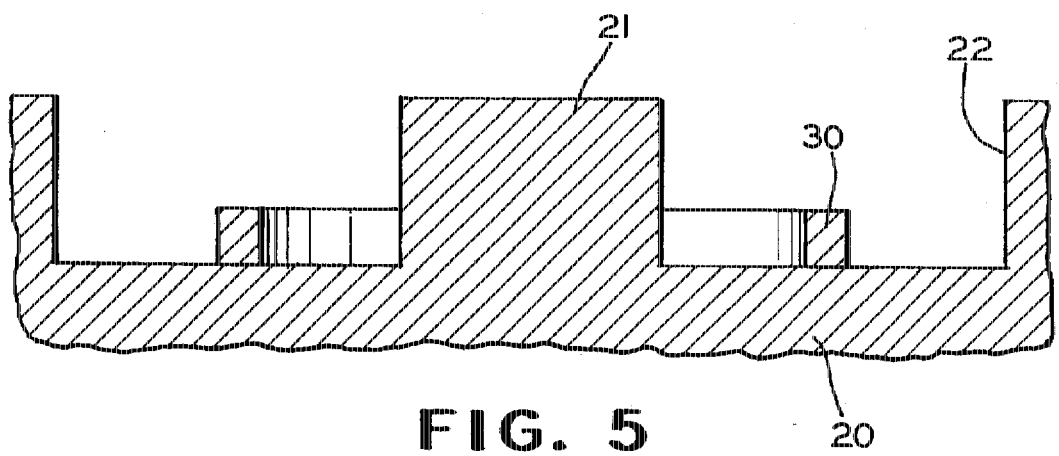
FIGS. 5, 6, and 7 are enlarged sectional elevational views illustrating the steps involved in a second embodiment of a method of forming the armature illustrated in FIG. 1 in accordance with this invention.
Figure 6:
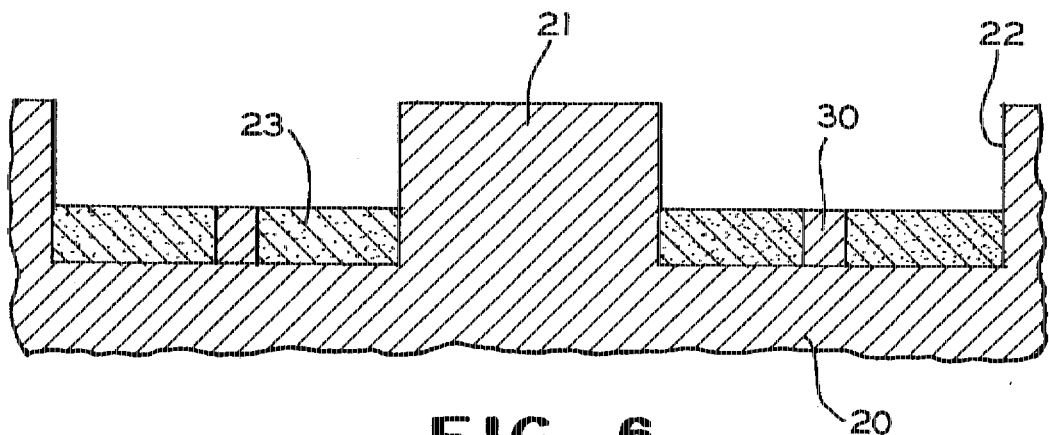
Figure 7:
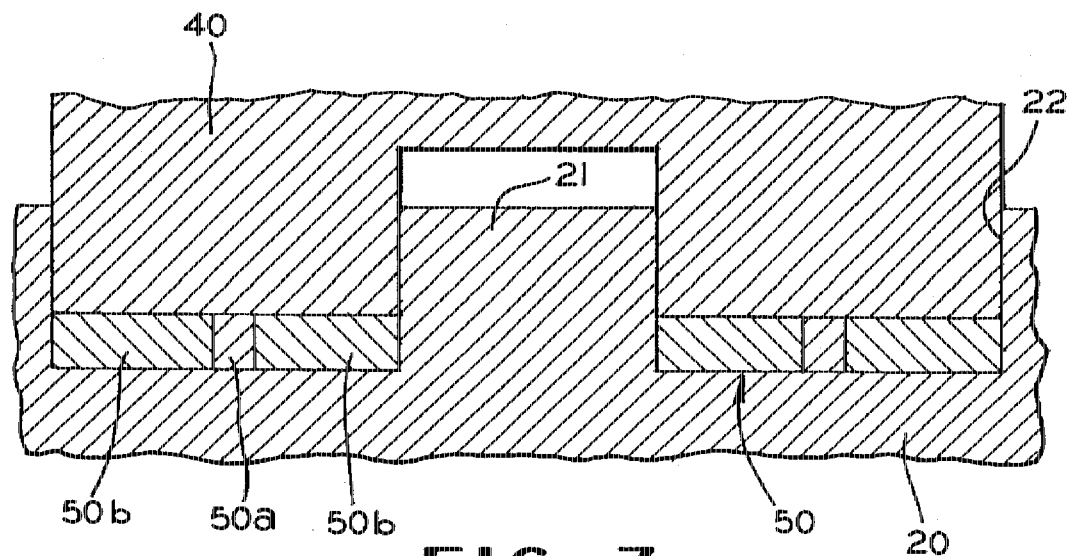

FIGS. 5, 6, and 7 illustrate a second embodiment of a method of forming the armature 14 discussed above in accordance with this invention. The method of the second embodiment is similar to the first embodiment, except that the preform 30 is disposed within the mold 20 prior to the powdered metal material 23. The ram 40 is moved axially downwardly into engagement with the preform 30 and the powdered metal material 23 to form the single integrated armature preform, indicated generally at 50, as discussed above.

The methods of this invention can be used to form the armature 14 having shapes or configurations other than that which is illustrated. Similarly, it will be appreciated that the methods of this invention can be used to form the pole piece 16 of the illustrated electromagnetic friction clutch 10. To accomplish this, the pole piece 16 can be primarily formed from the same compressed 45P is Anchorsteel phosphorous material 23 used to form the armature 14. The illustrated pole piece 16 has two annular regions of non-magnetically permeable material which can be formed by disposing two annular preforms 30 of differing size, one located concentrically within the other, on top of the quantity of powdered metal material 23 disposed within the mold cavity 22. Also, this invention can be used to form other components for the electromagnetic friction clutch 10 having regions of magnetically permeable material which are separate from regions of non-magnetically permeable material.

In accordance with the provisions of the patent statutes, the principle and mode of operation of this invention have been explained and illustrated in its preferred embodiment. However, it will be understood that this invention may be practiced otherwise than as specifically explained and illustrated without departing from its spirit or scope.

What is claimed is:

1. A method for manufacturing a component for use in an electromagnetically actuated clutch comprising the steps of:
   (a) providing a mold which defines a mold cavity;
   (b) providing a quantity of a magnetically permeable material within the mold cavity;
   (c) providing a quantity of a non-magnetically permeable material within the mold cavity; and
   (d) compressing the quantity of the magnetically permeable material and the quantity of the non-magnetically permeable material within the mold to form a single integrated component having regions of the magnetically permeable material and the non-magnetically permeable material therein so as to define separate pole regions within the component.

2. The method defined in claim 2 wherein said step (a) is performed by providing an upstanding central post within the mold to define an annular mold cavity.

3. The method defined in claim 1 wherein said step (b) is performed by providing a quantity of a powdered metal magnetically permeable material within the mold cavity.

4. The method defined in claim 3 wherein said step (b) is performed by providing a quantity of a ferromagnetic powdered metal magnetically permeable material within the mold cavity.

5. The method defined in claim 4 wherein the ferromagnetic powdered metal magnetically permeable material is formed from an iron alloy.

6. The method defined in claim 1 wherein said step (c) is performed by providing a preform of the non-magnetically permeable material.

7. The method defined in claim 6 wherein said step (c) is performed by forming the preform of the non-magnetically permeable material prior to disposing it within the mold.

8. The method defined in claim 7 wherein said step (c) is performed by forming the preform from an alloy of stainless steel powder.

9. The method defined in claim 8 wherein said step (c) is performed by forming the preform to have a density which is generally in the range of from 6.3 to 6.6 grams per cubic centimeter.

10. The method defined in claim 1 wherein said step (d) is performed by moving a ram of a press machine axially downwardly into engagement with quantity of the magnetically permeable material and the quantity of the non-magnetically permeable material.

11. The method defined in claim 1 further including the step of sintering the component.

12. The method defined in claim 1 wherein said step (b) is performed by providing a quantity of a powdered metal magnetically permeable material within the mold cavity, and wherein said step (c) is performed by providing a preform of the non-magnetically permeable material on top of the powdered metal magnetically permeable material.

13. The method defined in claim 12 wherein said step (d) is performed by moving a ram of a press machine axially downwardly into engagement with the quantity of the magnetically permeable material and the preform.

14. The method defined in claim 13 wherein the ram initially engages the preform so as to move it axially downwardly through the powdered metal material until the preform engages the lower surface of the mold.

15. The method defined in claim 14 wherein further downward movement of the ram compresses both the preform and the powdered metal material into the component.

16. The method defined in claim 15 further including the step of sintering the component.

17. The method defined in claim 1 wherein the component is an armature for use in an electromagnetically actuated friction clutch.

18. The method defined in claim 1 wherein the component is a pole piece for use in an electromagnetically actuated friction clutch.

19. The method defined in claim 1 wherein said step (b) is performed prior to said step (c).

20. The method defined in claim 1 wherein said step (c) is performed prior to said step (b).

* * * * *

UNITED STATES PATENT AND TRADEMARK OFFICE
CERTIFICATE OF CORRECTION

PATENT NO. : 5,708,955
DATED : January 13, 1998
INVENTOR(S) : James R. Ungrue

It is certified that error appears in the above-identified patent and that said Letters Patent is hereby corrected as shown below:

Claim 2, Line 1    change "2" to --1--.

Claim 10, Line 3    after "with" insert --the--.

Signed and Sealed this

Sixteenth Day of March, 1999

Q. TODD DICKINSON

Attest:

Attesting Officer    Acting Commissioner of Patents and Trademarks